(12) United States Patent
Chazono

(10) Patent No.: US 6,362,947 B2
(45) Date of Patent: Mar. 26, 2002

(54) MULTILAYER CERAMIC CAPACITOR

(75) Inventor: Hirokazu Chazono, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/735,229

(22) Filed: Dec. 12, 2000

(30) Foreign Application Priority Data

Dec. 24, 1999 (JP) .......................................... 11-366882

(51) Int. Cl.$^7$ .............................................. H01G 4/228
(52) U.S. Cl. ................. 361/306.3; 361/321; 361/306.1; 361/303; 361/310; 29/25.42
(58) Field of Search .......................... 361/306.3, 321.2, 361/303, 306.1, 308.2, 310, 320, 304, 309; 29/25.42

(56) References Cited

U.S. PATENT DOCUMENTS

| | | | | | |
|---|---|---|---|---|---|
| 3,617,834 A | * | 11/1971 | Charles | ....................... | 317/261 |
| 4,471,406 A | * | 9/1984 | Sawairi | ....................... | 361/328 |
| 5,251,094 A | * | 10/1993 | Amano et al. | ............... | 361/308 |
| 6,043,174 A | * | 3/2000 | Maher et al. | ................ | 501/137 |
| 6,124,769 A | * | 9/2000 | Igarashi et al. | .............. | 333/172 |
| 6,134,098 A | * | 10/2000 | Kuroda et al. | ............ | 361/321.1 |
| 6,141,846 A | * | 11/2000 | Miki | ......................... | 29/25.42 |
| 6,143,109 A | * | 11/2000 | Sano et al. | ............... | 156/89.16 |
| 6,254,715 B1 | * | 7/2001 | Okazaki et al. | .............. | 156/280 |

* cited by examiner

*Primary Examiner*—Dean A. Reichard
*Assistant Examiner*—Nguyen T Ha
(74) *Attorney, Agent, or Firm*—Rosenman & Colin, LLP.

(57) ABSTRACT

A multilayer ceramic capacitor includes a substantially cuboid-shaped laminated body formed with alternately stacked conductive layers and ceramic dielectric layers, and a pair of external electrodes respectively disposed at opposite end portions of the laminated body. The conductive layers are corrugated, and each of the conductive layers has a nonuniform and spatially varying thickness. Thus the surface area of the conductive layers is substantially increased, which in turn results in the increment of the electrostatic capacitance of the multilayer ceramic capacitor. Further, interrupted regions having the layer thickness of zero are formed on the conductive layer and since the boundary portions are pointed toward neighboring conductive layers, a strong electric field is formed threat. Accordingly, the electrostatic capacitance becomes increased.

13 Claims, 3 Drawing Sheets

MULTILAYER CERAMIC CAPACITOR

FIELD OF THE INVENTION

The present invention relates to a multilayer ceramic capacitor; and, more particularly, to a novel structure of conductive layers therein.

BACKGROUND OF THE INVENTION

Referring to FIG. 1, there is illustrated a partial cutaway perspective view of a conventional multilayer ceramic capacitor. The multilayer ceramic capacitor 100, as shown in FIG. 1, includes a laminated body 103 having alternately stacked ceramic dielectric layers 101 and conductive layers 102 and a pair of external electrodes 104-1, 104-2 respectively disposed at two opposite end portions of the laminated body 103. The conductive layers 102 are alternately connected to the external electrodes 104-1, 104-2: that is, the external electrode 104-1 is connected to every second conductive layer and the external electrode 104-2 is coupled with the remaining conductive layers not connected to the external electrode 104-1. The ceramic dielectric layers 101 and the conductive layers 102 have flat surfaces. Further, the thickness of the conductive layers 102 is spatially uniform without local variation. When a voltage is applied between the external electrodes 104-1, 104-2, the multilayer ceramic capacitor 100 stores electric charges in the conductive layers 102, thereby producing electric fields between every two neighboring conductive layers.

Nowadays, multilayer ceramic capacitors are required to be further scaled down but with higher capacitance. Such tasks, however, may not be successfully achieved with the capacitor 100. Accordingly, different types of multilayer ceramic capacitors have been proposed for that purpose. In FIG. 2, there is illustrated a cutaway perspective view of one of such improved prior art multilayer ceramic capacitors. A multilayer ceramic capacitor 100a shown in FIG. 2 differs from the conventional multilayer ceramic capacitor 100, in that the conductive layers 102a of the capacitor 100a are corrugated. As a result, the contact area between the conductive layers 102a and the ceramic dielectric layers 101a in capacitor 10a becomes larger than that in the capacitor 100 and, therefore the capacitance of the capacitor 100a increases.

Since, however, it is relatively difficult to make the corrugated conductive layers very thin, the ability to realize the miniaturization of multilayer ceramic capacitors with large capacitance by employing an increased number of such corrugated layers is inherently limited. Further, the corrugated conductive layers 102a require the use of a greater amount of conductive paste than the flat conductive layers 102. Generally, the conductive paste used in forming the conductive layers contributes to a large portion of the manufacturing cost of a multilayer ceramic. Therefore, the use of corrugated conductive layers would lead to an increased manufacturing cost.

SUMMARY OF THE INVENTION

It is, therefore, an object of the present invention to provide a miniaturized large capacitance multilayer ceramic capacitor with a low manufacturing cost.

In accordance with one aspect of the present invention, there is provided a multilayer ceramic capacitor, comprising:

a laminated body formed by alternately stacked ceramic dielectric layers and conductive layers, wherein the interfaces between the ceramic dielectric layers and the conductive layers are corrugated and the conductive layers have a nonuniform thickness.

The conductive layers are provided with interrupted regions devoid of a conductive material and the boundary portions of the conductive layers close to the interrupted regions are curved upward or downward along the stacking direction of the ceramic dielectric layers and the conductive layers.

In accordance with another aspect of the present invention, there is provided a method for forming a multilayer ceramic capacitor, comprising the steps of:

stacking ceramic green sheets having a conductive paste coated thereon; and pressing the stacked ceramic green sheets with a die having grooves on a pressing surface thereof, wherein an average depth of the grooves is between about 10 and 30% of an average thickness of a ceramic green sheet.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 3:
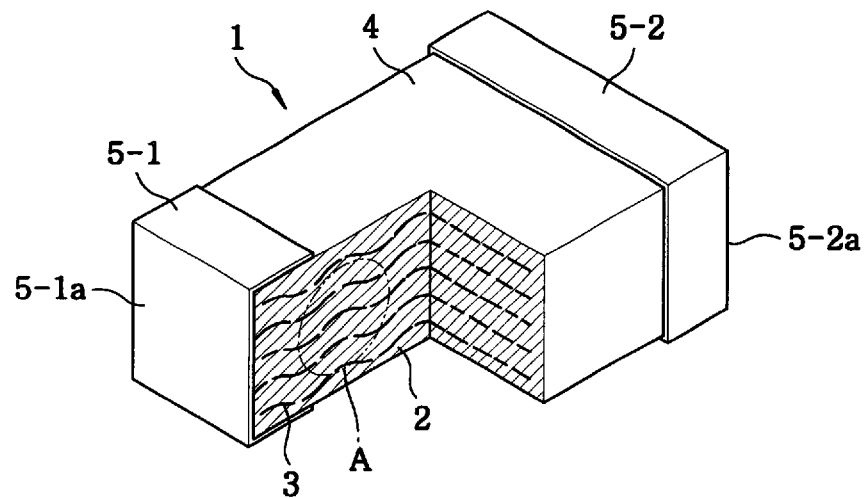
FIG. 3 depicts a cutaway perspective view of a multilayer ceramic capacitor in accordance with the present invention.
Figure 4:
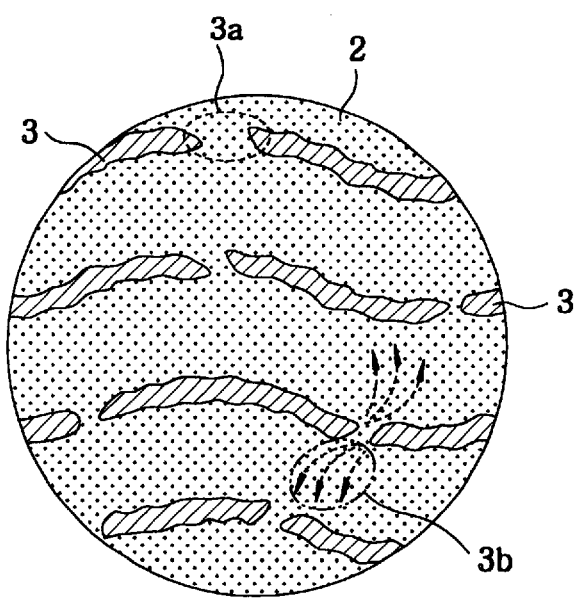
FIG. 4 exemplifies an enlarged partial cross sectional view of the multilayer ceramic capacitor shown in FIG. 3.
Figure 5:
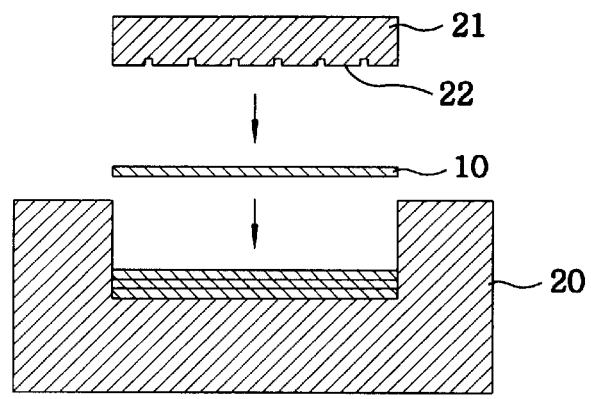
FIG. 5 demonstrates a stacking process of ceramic green sheets.

Referring to FIG. 3, there is illustrated a cutaway perspective view of a multilayer ceramic capacitor 1 in accordance with a preferred embodiment of the present invention. FIG. 4 shows an enlarged cross sectional view of a portion A of the multilayer ceramic capacitor 1.

As shown in FIG. 3, the multilayer ceramic capacitor 1 includes a substantially cuboid-shaped laminated body 4 composed of alternately stacked ceramic dielectric layers 2 and conductive layers 3 and a pair of external electrodes 5-1, 5-2 respectively disposed at opposite end portions of the laminated body 4. The conductive layers 3 are alternately connected to the external electrodes 5-1, 5-2, i.e., one external electrode 5-1 is connected to every second conductive layer and the other electrode 5-2 is coupled with the remaining conductive layers.

The main component of the ceramic dielectric layers 2 is, e.g., a $BaTiO_3$ based ceramic sintered body having a high dielectric constant. The conductive layers 3 include a metallic material, e.g., Pd, Ni, Ag or a combination thereof. The laminated body 4 is formed by first stacking ceramic green sheets having a conductive paste printed thereon and then sintering the stacked green sheets. The sintered ceramic green sheets become the ceramic dielectric layers 2, and the sintered conductive paste becomes the conductive layers 3. The external electrodes 5-1, 5-2 include a metallic material, for example, Ni, Ag or a combination thereof.

As shown in FIG. 4, the conductive layers 3 are corrugated, the corrugations of the conductive layers 3 preferably running substantially parallel to two opposite end surfaces 5-1a, 5-2a of the respective external electrodes 5-1, 5-2. In other words, the laminated body 4 is made of the ceramic dielectric layers 2 and the conductive layers 3 stacked against each other to have a wavy or uneven interface profile. Further, each of the conductive layers 3 has a nonuniform spatially varying thickness and the conductive layers 3 have interrupted regions 3a having the layer thickness of zero. In other words, there exist interrupted regions 3a devoid of the conductive material which are scattered in each of the conductive layers 3 when viewed from the top while still preserving the continuity of each of the conductive layers 3. Furthermore, the conductive layers 3 at the (boundary regions) close to the interrupted regions 3a (hereinafter referred to as "boundary portions") are curved upward or downward, preferably toward one the of neighboring conductive layers of each (boundary portion).

Figure 1:
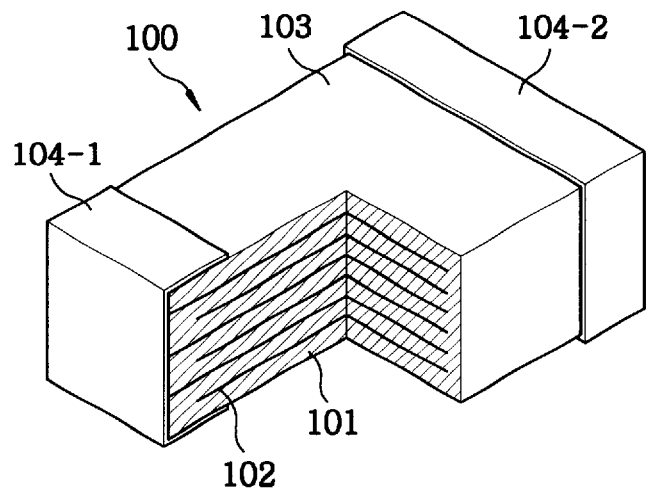
FIG. 1 shows a cutaway perspective view of a conventional multilayer ceramic capacitor.
Figure 2:
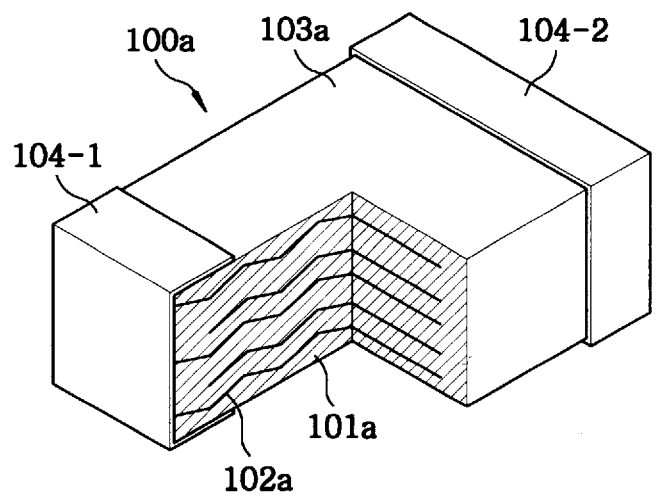
FIG. 2 illustrates a cutaway perspective view of an improved prior art multilayer ceramic capacitor.

Due to the waviness of the interface profile of the ceramic dielectric layers 2 and the conductive layers 3 and the varying thickness of the conductive layers 3, the surface area of the conductive layers 3 is substantially increased compared with that of the prior art conductive layers having the flat surfaces and/or the uniform thickness as shown in FIGS. 1 and 2. The increment of the surface area of the conductive layers 3 of the present invention gives rise to the increment of the interfacing area between two neighboring conductive layers, which in turn results in the increment of the electrostatic capacitance of the multilayer ceramic capacitor 1 of the present invention. In addition, since the (boundary portions) of the conductive layers 3 are pointed toward neighboring conductive layers, strong electric field 3b is formed threat toward the neighboring conductive layers to which the boundary portions are directed as shown in FIG. 4. Accordingly, the electrostatic capacitance between the conductive layers 3 becomes further increased.

An exemplary manufacturing method of the multilayer ceramic capacitor 1 will now be described. First, a ceramic slurry is obtained by mixing and agitating predetermined amounts of a dielectric ceramic material containing therein, e.g., $BaTiO_3$ or the like as the main component, an organic binder and an organic solvent or water. Then ceramic green sheets are obtained from the ceramic slurry through the use of a tape casting technique such as a doctor blade.

Next, a conductive paste is printed in the shape of a predetermined pattern on the ceramic green sheets using a method such as a screen printing method, an intaglio printing method or a relief printing method, wherein the thickness of the conductive paste printed on the ceramic green sheets is less than 3 μm and, preferably, less than about 1 μm. Metal particles in the conductive paste are aggregated during the sintering process to be described later and, therefore, the thickness of the conductive layers becomes nonuniform, entailing the formation of the interrupted portions devoid of metal particles in the conductive layers 3.

A laminated ceramic green body is then obtained by stacking and pressing the ceramic green sheets 10 provided with the conductive paste plated thereon. Specifically, the laminated ceramic green body is obtained by stacking the ceramic green sheets 10 in a support 20 of a press and pressing the stacked ceramic green sheets 10 in the thickness direction of the sheets 10 with a die 21 at a predetermined pressure.

The pressing surface 22 of the die 21 has a predetermined surface roughness, i.e., the pressing surface 22 is provided with recesses and protrusions. The roughness of the surface 22 can be obtained by forming grooves on a smooth surface of the die 21 of a metal or a resin by, e.g., grinding, cutting, embossing, etching, plating, or coating. It is preferable that the average depth of the grooves be between about 10 and 30% of the average thickness of the ceramic green sheets 10. By using the die 21 described above, the corrugated ceramic green body can be obtained.

Thereafter, laminated chips are obtained by dicing the laminated ceramic green body into a predetermined size in a predetermined temperature and atmospheric condition. Finally, external electrodes are formed at both ends of each sintered body by, e.g., dipping so that a multilayer ceramic capacitor is obtained.

As described above, since the conductive layers 3 of the multilayer ceramic capacitor 1 in accordance with the preferred embodiment of the present invention are corrugated to have wavy surfaces formed normal to the stacking direction of the dielectric ceramic sheets 2 and the thickness of the conductive layers 3 is nonuniform, the facing areas between neighboring conductive layers increase. Further, due to the presence of the interrupted regions 3a, devoid of the metal particles, formed in the conductive layers 3, there exists an electric field not only between the neighboring surfaces of the conductive layers 3 as in the prior art multilayer ceramic capacitors but also between the boundary portions of the conductive layers 3 at the peripheries of the interrupted regions 3a and their neighboring surfaces of the conductive layers. The formation of the electric field at the (boundary portions) of the conductive layers 3 gives rise to an effect equivalent to further increased surface areas of the conductive layers. Since the (boundary portions) of the conductive layers are configured to have edges pointing toward a surface of a neighboring conductive layer in accordance with the present invention, a strong electric field formation can be achieved threat definitely. Consequently, the capacitance of the capacitor of the invention can be substantially increased.

Further, since the thickness of each conductive layer need not be uniform, but it is rather preferable to have a varying thickness, it is relatively easy to scale down the thickness of the conductive layers. Therefore, it becomes possible to further miniaturize a capacitor or increase the capacitance thereof by stacking an increased number of layers.

Figure 6:
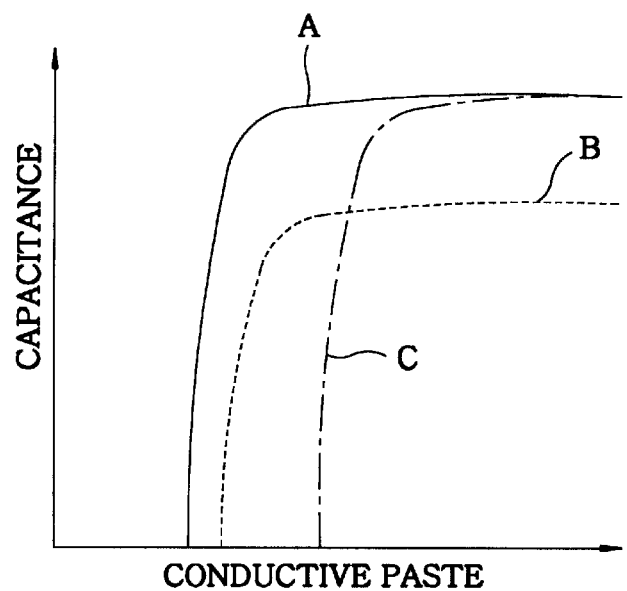
FIG. 6 presents electrostatic capacitance curves as a function of the amounts of conductive paste used in forming conductive layers.

Referring to FIG. 6, there are illustrated curves, each indicating the relationship between the electrostatic capacitance and the amount of conductive paste used for one capacitor. In the drawing, curves A, B, C correspond to the multilayer ceramic capacitor 1 of the present invention, and the conventional capacitors 100 shown in FIG. 1 and 100a shown in FIG. 2, respectively.

As shown in FIG. 6, the capacitance of a capacitor generally drops rapidly when the amount of conductive paste used is decreased below a certain point. It is generally required that the multilayer ceramic capacitors be scaled down while preserving the large capacitance. And in terms of the manufacturing cost, it is preferable to use a reduced amount of conductive paste since the conductive paste contributes to a large portion of the manufacturing cost of a multilayer ceramic capacitor.

The improved prior art multilayer ceramic capacitor 100a including the corrugated conductive layers 102a (curve C) can achieve a larger capacitance than the conventional capacitor 100 (curve B) as shown in FIG. 6. Since, however, the minimum amount of conductive paste used to form the conductive layers 102a of the capacitor 100a is lager than that of the capacitor 100, the manufacturing cost of the capacitor 100a becomes higher. On the contrary, a greater capacitance and a reduced manufacturing cost can be achieved by the multilayer ceramic capacitor 1 in accordance with the present invention as noted by curve A shown in FIG. 6.

Although the conductive layers have been described with respect to the preferred embodiment of the invention in that the nonuniformity in the layer thickness is attained by the aggregation of the conductive particles taking place during the sintering process of thin films of conductive paste, the present invention should not be construed to be limited thereto. For instance, the nonuniformity of the conductive layer thickness can be obtained by using a conductive paste containing therein an increased amount of a common material compared with that normally used in the art. The common material represents nonconductive ceramic powder commonly contained in the ceramic slurry and the conductive paste. Specifically, if a conductive paste containing therein conductive powder, e.g., Pd, Ni, or Ag powder, and a common material, $BaTiO_3$ in a ratio of 100 to about 30–50 in weight (the ratio of the conductive powder in this case is relatively lower than that typically used in the art) is used in forming the conductive layers, there occur some portions devoid of the conductive powder in the layers of the conductive paste during the sintering process due to the relatively low concentration of the conductive powder. As a result, the thickness of the conductive layers becomes nonuniform and interrupted portions are formed in the conductive layers, wherein an interrupted portion is a region where there is no conductive material between two neighboring dielectric ceramic layers of a conductive layer.

EXAMPLE 1

A method for manufacturing a multilayer ceramic capacitor will be now described in detail. First, a ceramic slurry was provided by mixing a dielectric ceramic material, containing, $BaTiO_3$ as the main component, with a butyral-based organic binder, i.e., polyvinyl butyral, an organic solvent, i.e., ethanol, and other additives, i.e., dioctyl phthalate. The slurry was coated on a PET film by a roll coater to obtain ceramic green sheets having a thickness of about 10 $\mu$m. A conductive paste having metal powder, i.e., Ni powder, and a common material, i.e., $BaTiO_3$ of about 20 wt% of the conductive powder was then printed in the shape of a predetermined pattern on the ceramic green sheets by means of the screen printing method to form internal electrodes, wherein the average film thickness of the conductive paste was about 1 $\mu$m.

Next, the ceramic green sheets having the paste coated thereon were blanked in a rectangular shape of a predetermined dimension and then stacked and pressed to form a laminated ceramic green body. A pressing surface of a die had a surface roughness of about 3 $\mu$m when measured by a profilometer.

Then, the laminated ceramic green body was diced into chips of 5 mm×3 mm by a dicer. And, the chip-shaped laminated ceramic bodies were treated at about 1200° C. to obtain sintered bodies. Finally, external electrodes were formed on two opposite end portions of each sintered body by baking a conductive paste containing Ag powder, ethyl cellulose and butyl carbitol as a binder and barium borosilicate as a glass frit, applied thereon to thereby obtain the multilayer ceramic capacitors of the present invention.

EXAMPLE 2

Another exemplary manufacturing method of a multilayer ceramic capacitor will now be explained in detail. First, a ceramic slurry was provided by mixing a dielectric ceramic material, containing $BaTiO_3$ as the main component, with a butyral-based organic binder, i.e., polyvinyl butyral, an organic solvent, i.e., ethanol, and other additives, i.e., dioctyl phthalate. The slurry was applied on a PET film by a roll coater to obtain ceramic green sheets having a thickness of about 10 $\mu$m. A conductive paste having metal powder, i.e., Ni powder, and a common material, i.e., $BaTiO_3$, of about 40 wt% of the metal powder was then printed in the shape of a predetermined pattern on the ceramic green sheets by means of the screen printing method to form internal electrodes, wherein the average film thickness of the conductive paste was about 1 $\mu$m. The remaining procedure was identical to that of the Example 1.

While the invention has been shown and described with respect to the preferred embodiments, it will be understood by those skilled in the art that various changes and modifications may be made without departing from the spirit and scope of the invention as defined in the following claims.

What is claimed is:

1. A multilayer ceramic capacitor, comprising:
    a laminated body formed by alternately stacked ceramic dielectric layers and conductive layers,
    wherein the ceramic dielectric layers and the conductive layers are corrugated and the conductive layers have a nonuniform thickness.

2. The multilayer ceramic capacitor of claim 1, wherein the conductive layers are provided with interrupted regions devoid of a conductive material.

3. The multilayer ceramic capacitor of claim 2, wherein boundary portions of the conductive layers, close to the interrupted regions, are curved upward or downward toward a stacking direction of the ceramic dielectric layers and the conductive layers.

4. The multilayer ceramic capacitor of claim 3, wherein a boundary portion points toward one of its neighboring conductive layers.

5. The multilayer ceramic capacitor of claim 1, wherein corrugations of the ceramic dielectric layers and the conductive layers run substantially parallel to each other.

6. The multilayer ceramic capacitor of claim 1, a conductive paste used in forming the conductive layers includes a conductive material and a ceramic material with a ratio of 100 to about 30–50 in weight.

7. The multilayer ceramic capacitor of claim 6, wherein the ceramic material is commonly used in forming the ceramic dielectric layers.

8. The multilayer ceramic capacitor of claim 1, wherein the conductive layers are formed by sintering layers of the conductive paste having a thickness of less than about 3 $\mu$m.

9. The multilayer ceramic capacitor of claim 8, wherein the layers of the conductive paste have a thickness of less than about 1 $\mu$m.

10. A method for forming the multilayer ceramic capacitor of claim 1, comprising the steps of:
    stacking ceramic green sheets having a conductive paste coated thereon; and
    pressing the stacked ceramic green sheets with a die having grooves on a pressing surface thereof, wherein an average depth of the grooves is between about 10 and 30% of an average thickness of a ceramic green sheet.

11. The multilayer ceramic capacitor of claim 1, wherein each conductive layer is provided with interrupted regions devoid of a conductive material, the interrupted regions being scattered in each conductive layer when viewed from the top while still preserving the continuity of each conductive layer.

12. The multilayer ceramic capacitor of claim 11, wherein boundary portions of each conductive layer, close to the interrupted regions, are curved upward or downward toward a stacking direction of the ceramic dielectric layers and the conductive layers.

13. The multilayer ceramic capacitor of claim 12, wherein a boundary portion points toward one of its neighboring conductive layers.

* * * * *